US 7,899,954 B2

(12) United States Patent
Kanazawa et al.

(10) Patent No.: US 7,899,954 B2
(45) Date of Patent: Mar. 1, 2011

(54) RELAY CONNECTOR UNIT AND ELECTRONIC DEVICE CONTROL SYSTEM

(75) Inventors: Akiyoshi Kanazawa, Susono (JP); Takashi Gohara, Susono (JP)

(73) Assignee: Yazaki Corporation, Tokyo (JP)

( * ) Notice: Subject to any disclaimer, the term of this patent is extended or adjusted under 35 U.S.C. 154(b) by 480 days.

(21) Appl. No.: 11/971,631

(22) Filed: Jan. 9, 2008

(65) Prior Publication Data
US 2008/0218246 A1 Sep. 11, 2008

(30) Foreign Application Priority Data
Mar. 9, 2007 (JP) ............................. 2007-060576

(51) Int. Cl.
*G06F 13/00* (2006.01)
*H01R 27/00* (2006.01)
*H03K 17/00* (2006.01)

(52) U.S. Cl. ..................... 710/33; 710/32; 174/72 A; 439/189; 439/516

(58) Field of Classification Search .............. 710/32, 710/33; 174/72 A; 439/189, 516
See application file for complete search history.

(56) References Cited

U.S. PATENT DOCUMENTS

| 4,952,913 | A | 8/1990 | Pauley et al. |
| 6,424,248 | B1 | 7/2002 | Toms et al. |
| 6,447,331 | B1 * | 9/2002 | Fukatsu et al. .............. 439/516 |
| 6,906,261 | B2 * | 6/2005 | Kondoh et al. ............. 174/72 A |
| 7,189,925 | B2 * | 3/2007 | Kondoh et al. ............. 174/72 A |
| 7,297,029 | B2 * | 11/2007 | Ueno et al. ............. 439/620.21 |
| 7,410,281 | B2 * | 8/2008 | Menze et al. ................ 362/543 |
| 2002/0072345 | A1 | 6/2002 | Toth et al. |

FOREIGN PATENT DOCUMENTS

| JP | 2003-134720 A | 5/2003 |
| JP | 2005285411 A | * 10/2005 |

OTHER PUBLICATIONS

Extended European Search Report dated Jun. 13, 2008.

* cited by examiner

*Primary Examiner*—Tammara Peyton
(74) *Attorney, Agent, or Firm*—Sughrue Mion, PLLC (57) ABSTRACT

A relay connector unit for communicating an electronic control unit with a plurality of electronic devices includes: a first connecting unit connected to the electronic control unit; a second connecting unit having a plurality of circuits connected to the electronic devices respectively; and a transferring unit connected to the first connecting unit and the second connecting unit. The transferring unit transmits first information received by the first connecting unit from the electronic control unit to at least one of the electronic devices through a corresponding circuit, on the basis of circuit identifying data included in first information, the circuit identifying data indicating the corresponding circuit to be transferred to or from. The transferring unit appends the circuit identifying data to second information received from one of the electronic devices through the corresponding circuit to transmit the second information to the electronic control unit through the first connecting unit.

11 Claims, 4 Drawing Sheets

RELAY CONNECTOR UNIT AND ELECTRONIC DEVICE CONTROL SYSTEM

BACKGROUND

This invention relates to a relay connector unit and an electronic device control system for controlling plural electronic devices by a single electronic control unit.

A vehicle such as a passenger car or a track incorporates a great variety of electric devices such as a motor constituting an air conditioner, a wiper and a power window. In order to transmit electric power and control signals, wire harnesses are arranged. The wire harness has plural electric wires and a connector for housing terminal metal fittings connected to the terminals of the electric wires. The electric wire is a "sheathed wire" provided with a conductive core and an insulating sheath for covering the core.

As the connector for the wire harness described above, used is a connector with a built-in electronic component (e.g. see Patent Reference 1), which incorporates circuit elements and others, in order to connect, via a network by data communication, an electronic device such as various actuators and an electronic control unit (ECU) such as a computer. Such a kind of connector with a built-in electronic component incorporates within its housing a lead frame with the circuit element.

The connector with built-in electronic component disclosed in Patent Reference 1 is supplied with a power source for driving the electronic element. To this end, in order that it is surely supplied with the power source by a simple configuration, it is attached to the middle position of the electric wire in a longitudinal direction so that the electric wires are derived from both ends in this direction to connect the connector to the electric wires. Further, plural connectors with built-in electronic component are attached apart from one another along the longitudinal direction of the electric wire so that they are fit to the various electronic devices to be connected to the network.

[Patent Reference 1] JP-A-2003-134720

However, in the case of using the connectors with a built-in electronic component described above, they must be matched with mating connector shapes different for the respective electronic devices. So, it is difficult to standardize the connectors with a built-in electronic component. In addition, most of the connectors on the side of the electronic devices are a male type so that the connectors with a built-in electronic component must be realized as a female type. The female type is very complicate in structure, and so disadvantageous in cost.

Figure 4:
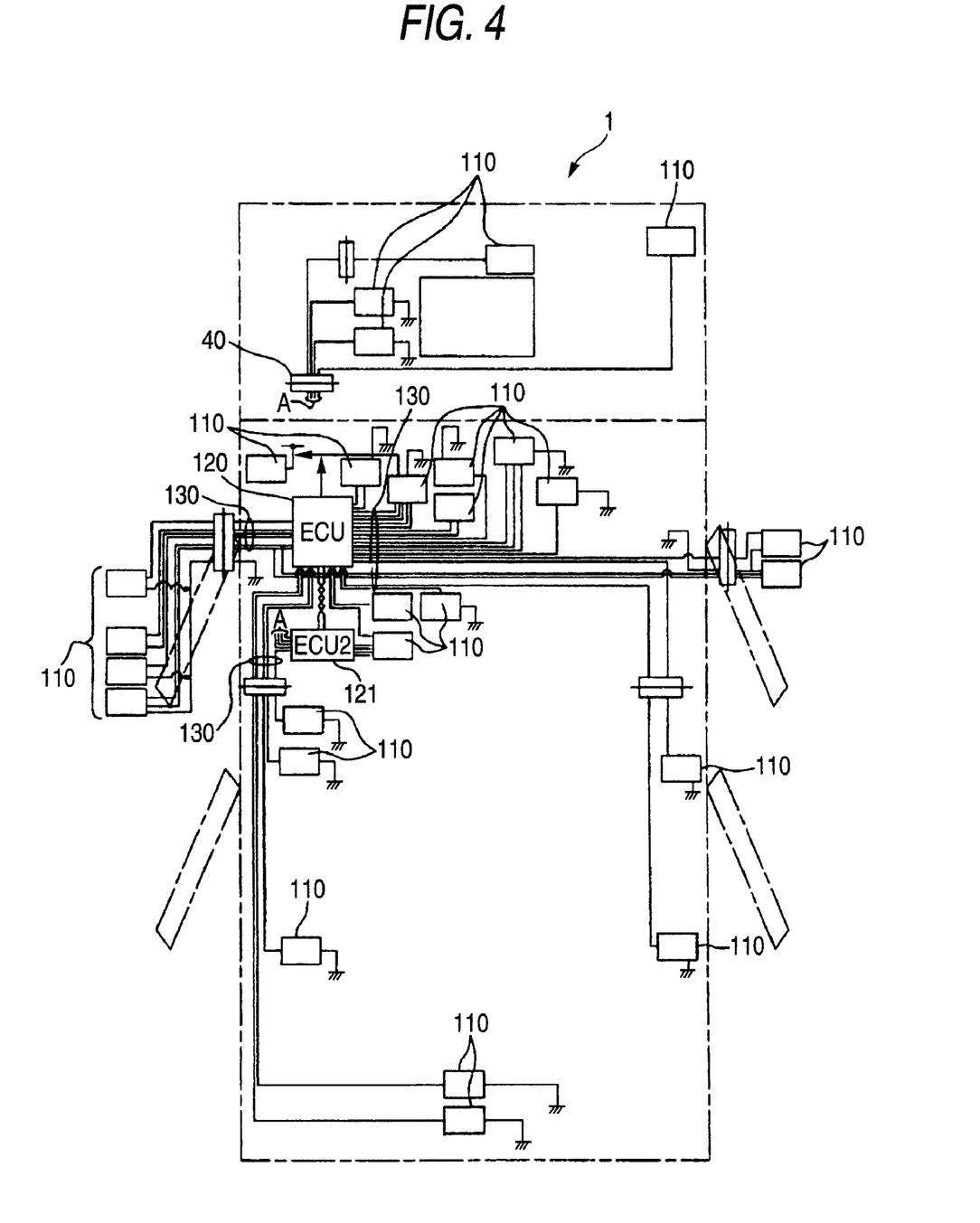
FIG. 4 is a view showing an example of a conventional system configuration in a vehicle.

In order to obviate such inconvenience, as shown in FIG. 4, the wire harnesses 130 connected to plural electronic devices 110, respectively are directly connected to an ECU 120 so that the ECU 120 individually controls each electronic device 110. To a second ECU 121, the electronic devices 110 such as a park brake switch and a brake oil level switch are connected so that the information relative thereto is supplied to the ECU 120. In this way, the plural wire harnesses 130 are connected to the ECU 120 so that with an increase in the number of the electronic devices 110 to be controlled by the ECU 120, the ECU 120 is disadvantageously upsized.

Further, if the number of the electronic devices 110 loaded on a vehicle 5 increases, regardless of the processing capability of the ECU 120, plural ECUs must be mounted on the vehicle 5 and the plural electronic devices 110 are grouped to be connected to each ECU. This results in an increase in cost.

SUMMARY

Accordingly, in view of the above problems, an object of this invention is to provide a relay connector unit and an electronic device control system for controlling plural electronic devices, without upsizing the electronic control unit (ECU).

In order to attain the above object, the invention provides a relay connector unit for communicating an electronic control unit with a plurality of electronic devices, including:

a first connecting unit connected to the electronic control unit;

a second connecting unit having a plurality of circuits connected to the electronic devices respectively; and a transferring unit connected to the first connecting unit and the second connecting unit, wherein the transferring unit transmits first information received by the first connecting unit from the electronic control unit to at least one of the electronic devices through a corresponding circuit connected to the at least one of the electronic devices, on the basis of circuit identifying data included in first information, the circuit identifying data indicating the corresponding circuit to be transferred to or from; and wherein the transferring unit appends the circuit identifying data to second information received from one of the electronic devices through the corresponding circuit to transmit the second information to the electronic control unit through the first connecting unit.

In the relay connector unit, the electronic control unit is connected to the first connecting unit; and the plural electronic devices are connected to the circuits of the second connecting unit, respectively. The transferring unit, when it receives the first information from the electronic control unit through the first connecting unit, transfers the first information to the pertinent electronic device through the corresponding circuit 43 of the second connecting unit indicated by the circuit identifying data contained in the first information. The transferring unit, when it receives the second information from the electronic device through the circuit of the second connecting unit, transfers the second information, after appending the circuit identifying data indicative of the circuit, to the electronic control unit through the first connecting unit.

Preferably, the transferring unit appends address data assigned to the relay connector unit to the second information.

In accordance with the relay connector unit, the transferring unit, when it receives the second information from the electronic device through the circuit of the second connecting unit, transmits the second information supplemented with the circuit identifying data and the address data to the electronic control unit through the first connecting unit.

Preferably, the first connecting unit is connected to the electronic control unit through a first wire harness; and the circuits are connected to the electronic devices through a plurality of corresponding second wire harnesses respectively.

In the relay connector unit, the first wire harness is connected to the first connecting unit of the relay connector unit; and the second wire harness connected to each of the plural electronic devices is connected to any circuit of the second connecting unit. Further, since the first wire harness is connected to the electronic control unit and the second wire harnesses are connected to the electronic devices, respectively, the transferring unit transmits the first information from the electronic control unit to the pertinent electronic device and transmits the second information from the electronic device to the electronic control unit.

The invention to solve the above problem provides an electronic device control system, comprising:

a relay connector unit which includes:
a first connecting unit;
a second connecting unit having a plurality of circuits; and
a transferring unit connected to the first connecting unit and the second connecting unit;
a plurality of electronic devices;
an electronic control unit which controls the electronic devices;
a first wire harness which connects the first connecting unit to the electronic control unit; and
a plurality of second wire harnesses which connects the circuits to the electronic devices, respectively,
wherein the transferring unit transmits first information received by the first connecting unit from the electronic control unit to at least one of the electronic devices through a corresponding circuit connected to the at least one of the electronic devices, on the basis of circuit identifying data included in first information, the circuit identifying data indicating the corresponding circuit to be transferred to or from;
wherein the transferring unit appends the circuit identifying data to second information received from one of the electronic devices through the corresponding circuit to transmit the second information to the electronic control unit through the first connecting unit; and
wherein the electronic control unit includes a transmitting and receiving unit which transmits the first information to the first connecting unit and receives the second information from the first connecting unit.

In the electronic device control system, the first connecting unit of the relay connector unit and the electronic control unit are connected by the first wire harness, and the plural electronic devices are connected to the second connecting unit by the second wire harnesses. When the transmitting/receiving unit of the electronic control unit transmits the first information to the first connecting unit, the transferring unit of the relay connector unit transmits the first information to the pertinent electronic device. The transferring unit of the relay connector unit transmits the second information from the electronic device to the electronic control unit and the transmitting/receiving unit of the electronic control unit receives the second information.

As descried above, the relay connector unit according to this invention includes a first connecting unit to which a first wire harness connected to the electronic control unit is connected; a second connecting unit to which second wire harnesses connected to the plural electronic devices, respectively are connected; and a transferring unit which transfers the information received by each of these connecting unit to the pertinent unit/device. For this reason, even when the electronic control unit collectively controls the plural electronic devices, only the first wire harness may be connected to the electronic control unit, thereby simplifying the connecting structure such as the number of circuits in the electronic control unit. Further, the relay connector unit, which is located among the wire harnesses remote from the electronic devices, is advantageous from the viewpoint of strength as compared with a conventional relay connector unit connected to the electronic devices. This prevents the electronic control unit from being upsized, permits the plural electronic devices to be controlled, and contributes the cost reduction. Further, since the relay connector unit according to this invention can easily deal with an increase in the number of the electronic devices to be controlled by the electronic control unit, the system structuring can be facilitated. Further, even where the connecting structure of the electronic device has a peculiar shape, it has only to be connected to the second connecting unit by the second wire harness, thereby permitting the relay connector units to be standardized.

Further, since the relay connector unit transmits the second information from the electric device, after supplemented with the address data, to the electronic control unit, multiplex communication between the plural relay connector units and the electronic control unit can be realized through the first wire harness. Thus, even if the number of the relay connector units is increased, the common first wire harness has only to be connected to the electronic control unit. Thus, upsizing of the electronic control unit is prevented and a larger number of electronic devices can be collectively controlled.

As described above, in the relay connector unit and electronic device control system according to this invention, the first wire harness is connected to the first connecting unit of the relay connector unit, the plural second wire harnesses are connected to the second connecting unit of the relay connector unit, the electronic control unit is connected to the first wire harness and the plural electronic devices are connected to the second wire harnesses, respectively. For this reason, only the first wire harness may be connected to the electronic control unit so that the connecting structure such as the number of circuits in the electronic control unit can be simplified. Further, since the plural second wire harnesses can be collectively connected to the relay connector unit, the plural electronic devices can be easily established at different places, thereby greatly facilitating the system structuring. Further, if the relay connector unit is prepared in the form of the wire harness assembly, the electronic control unit and the electronic devices have only to be connected to the wire harnesses of the wire harness assembly so that the production efficiency can be improved.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION

Now referring to FIGS. 2 to 4, an explanation will be given of a detailed description of a relay connector unit, a wire harness assembly and an electronic device control system according to this invention.

Figure 1:
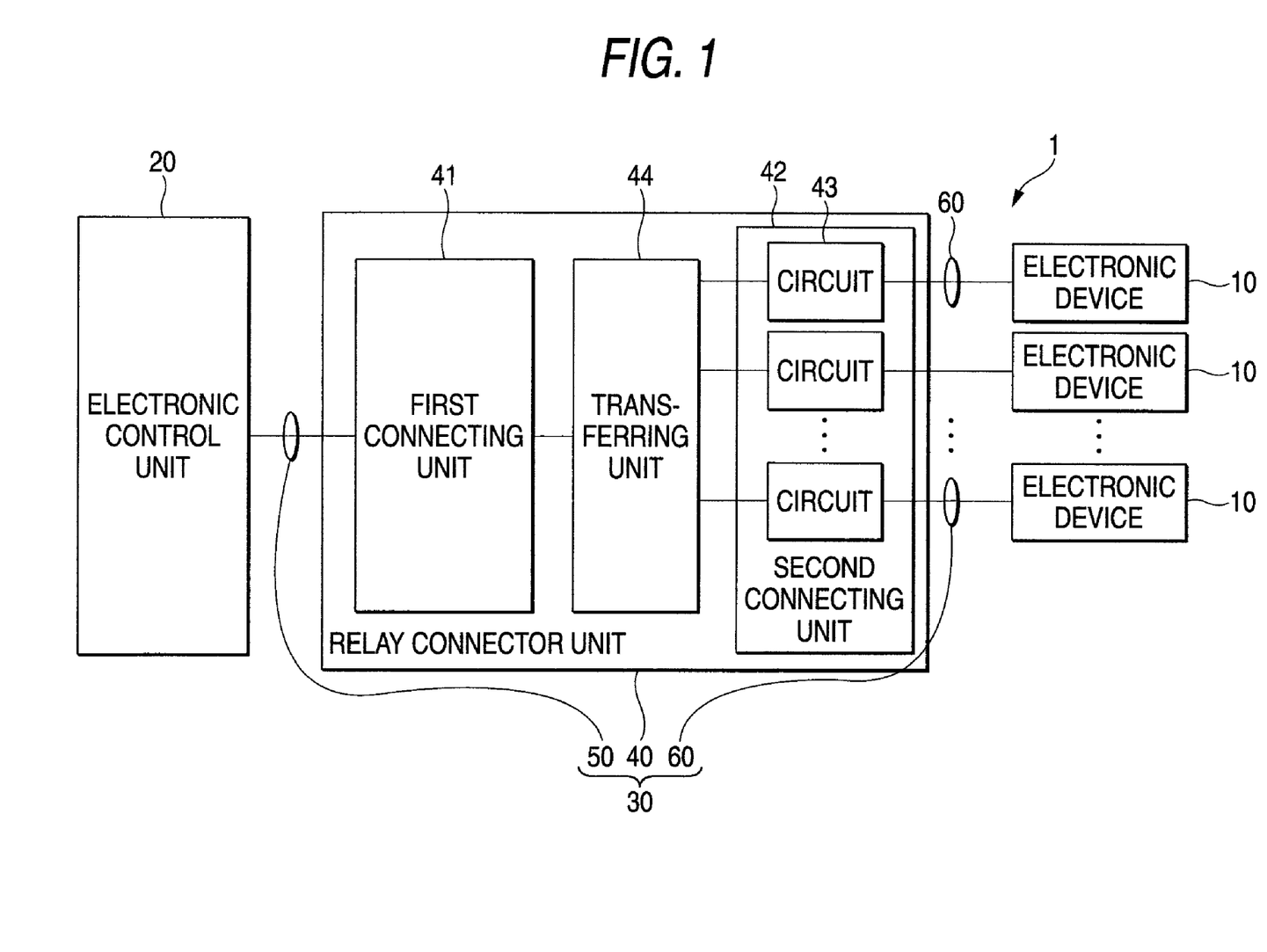
FIG. 1 is a view showing the basic configuration of a relay connector unit, a wire harness assembly and an electronic device control system according to this invention.
Figure 2:
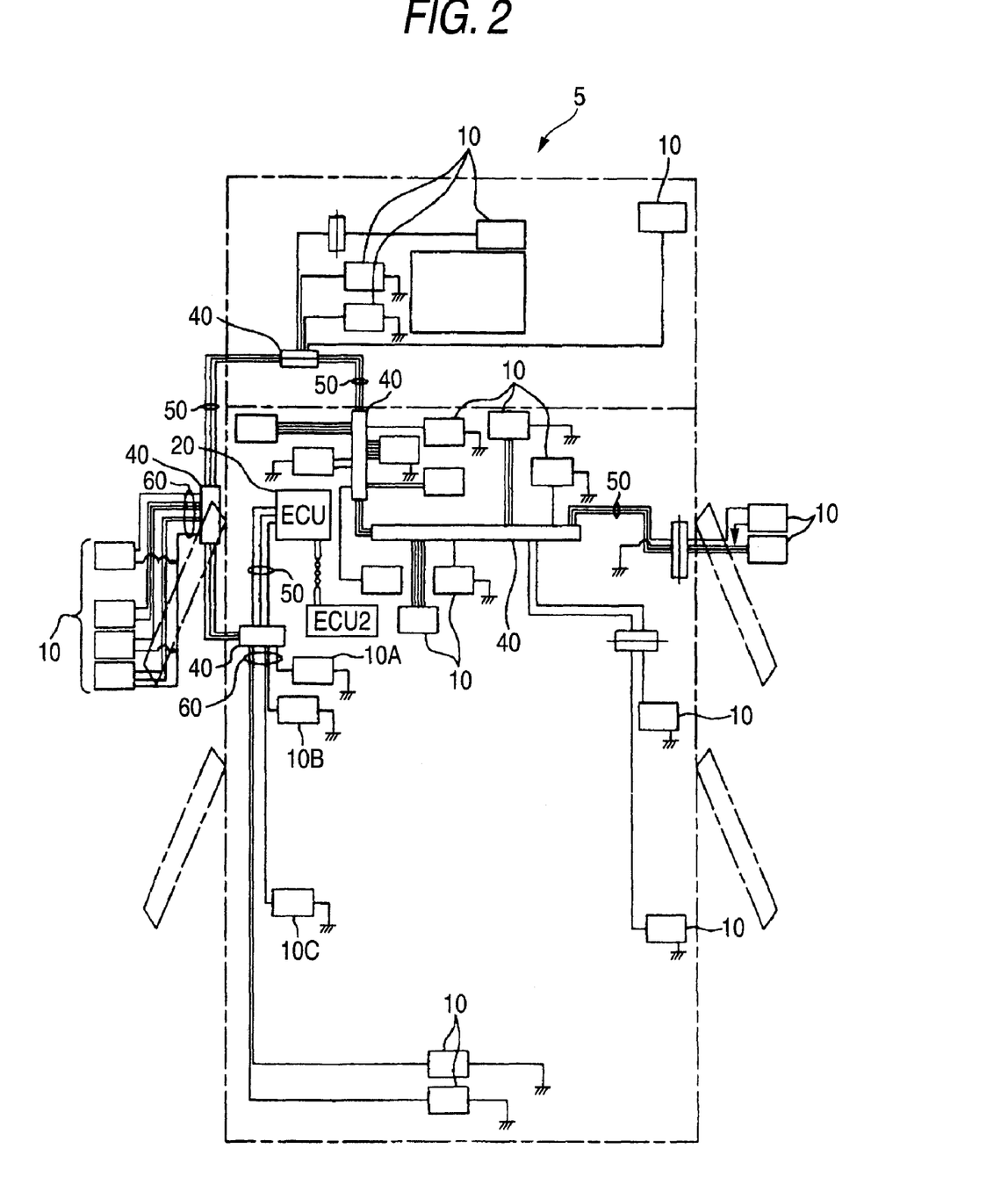
FIG. 2 is a view showing the schematic configuration of a relay connector unit, a wire harness assembly and an electronic device control system according to this invention.

Referring to FIG. 2, an electronic device control system 1 is loaded on a vehicle 5. The electronic device control system 1 includes plural electronic devices 10 dottedly located on the vehicle 5, an electronic control unit (ECU) 20 for controlling the plural electronic devices 10 and a wire harness assembly 30 for communicatably connecting the plural electronic devices 10 and the ECU 20.

The plural electronic devices 10 are, for example, a door switch, a trunk switch, a door lock status switch, a door key control unit, a fuse junction box, a card slot unit, various status switches, a shift position switch, etc.

In this description, for simplicity of explanation, the explanation will be given of only electronic devices 10A, 10B and 10C shown in FIG. 3 among the plural electronic devices 10 shown in FIG. 2. Each of the electronic device 10A to 10C includes electronic components 11 intrinsic to the device and a connector 12 electrically connected to the terminals of the electronic components 11. It should be noted that the electronic components 11 is connected to the connector 12 via a wiring pattern of a board and electric wires.

In the case of the electronic device 10A, 10C, the electronic components 11 are e.g. a motor and a display or displays. In the case of the electronic device 10B, the electronic components 11 are a fan and others. The connector 12 is a male type connector which has a peculiar shape corresponding to the number of terminals in the electronic device 10, for example, five terminals in the electronic device 10A, four terminals in the electronic device 10B and eight terminals in the electronic device 10C.

Figure 3:
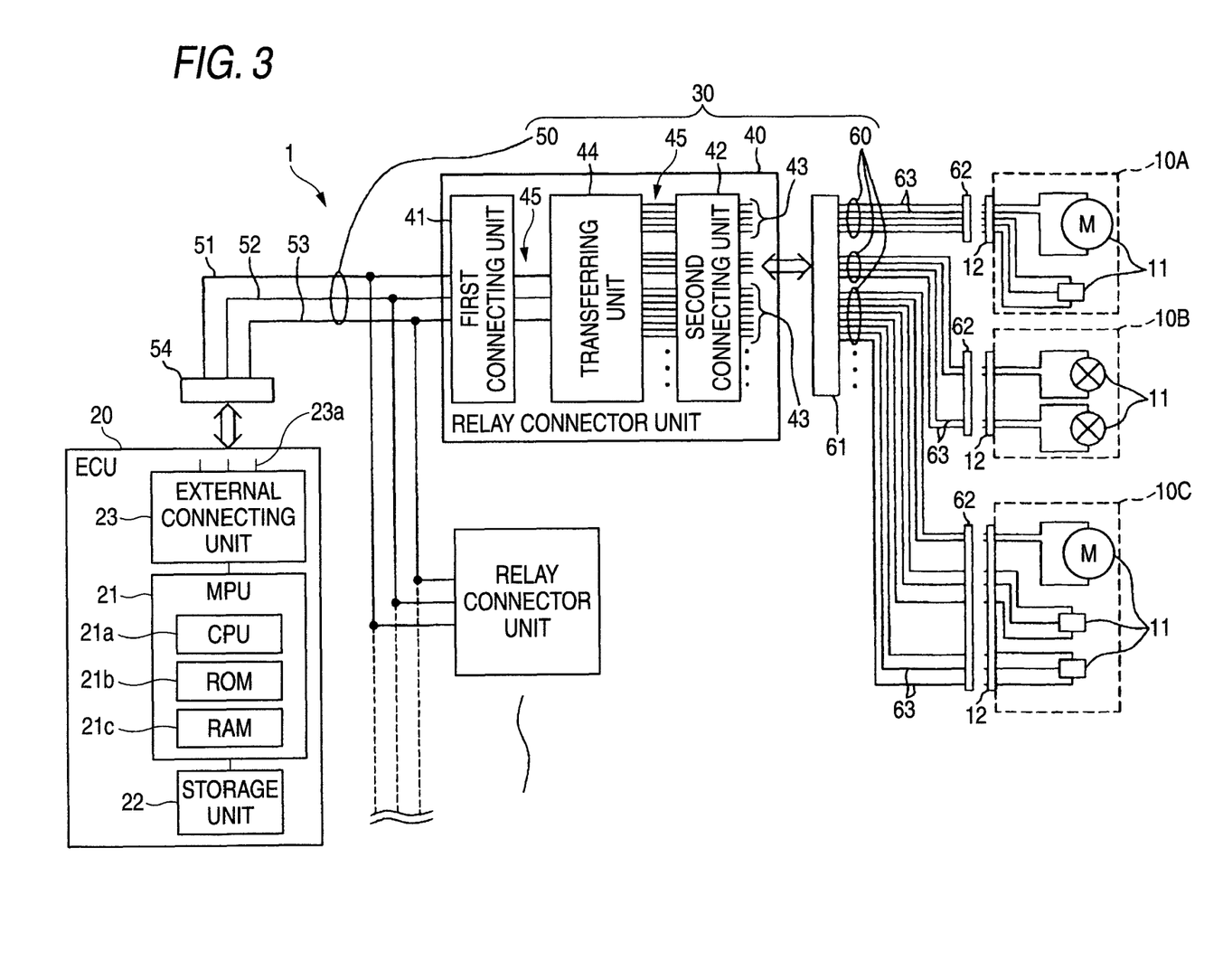
FIG. 3 is a view showing an example of the system configuration of a relay connector unit, a wire harness assembly and an electronic device control system according to this invention.

The ECU 20 includes, as shown in FIG. 3, a microprocessor (MPU) 21 which operates according to a predetermined program. The MPU 21, as well known, includes a central processing unit (CPU) 21a which performs various kinds of processing or control according to a predetermined program, a ROM 21b which is a read-only-memory storing a program for the CPU 21a and others, and a RAM 21c which is a readable/writable memory storing various data and having an area necessary for the processing operation of the CPU 21a.

The ECU 20 further includes a storage unit 22 which is an EEPROM capable of holding various stored data even when power supply is interrupted and has various kinds of storage areas necessary for the processing operation of the CPU 21a. The MPU 21 is connected to the storage unit 22 to write on and read from the storage unit 21.

The ECU 20 has an external connecting unit 23 serving as a transmitting/receiving unit. The external connecting unit 23 has plural (three in FIG. 3) terminals 23a which are electrically connected to electric wires 51, 52, 53 in such a manner that a connector 54 provided at the end of a first wire harness 50 described later is fitted to the external connecting unit 23. The first information from the MPU 21 is transmitted to a relay connector unit 40 through a signal line 51 of the first wire harness 50. The second information is transmitted to the MPU 21 from the relay connector unit 40 through the signal line 51.

The wire harness assembly 30, as shown in FIG. 2, includes plural (five in FIG. 2) relay connector units 40, a single first wire harness 50 for the ECU 20 and plural second wire harnesses 60.

The relay connector unit 40 serves as a unit for communicatably connecting the plural electronic devices 10 to the single ECU 20 for controlling these plural electronic devices 10. The relay connector unit 40 includes a first connecting unit 41, a second connecting unit 42 and a transferring unit 44.

The first connecting unit 41 has plural crimping terminals (not shown) crimped to the respective electric wires of the first wire harness 50. The crimping terminal has a pair of crimping blades. By only crimping each electric wire 51 to 53 in between the pair of crimping blades, the blades cut into the covering of the electric wire 51 to 53 to come in contact with the core thereof. Thus, the first connecting unit 41 is electrically connected to the first wire harness 50.

The second connecting unit 42 has plural terminals 43 (corresponding to circuits) formed like a rod extended linearly. The second connecting unit 42 is formed as a male type connector having a shape corresponding to a connector 61 to which the arranged plural second wire harnesses 60 are connected. The plural terminals 43 are electrically connected to a lead frame of the transferring unit 44 through coupling units 45, respectively. The number of the terminals 43 in the second connecting unit 42 is optionally determined, for example can be set according to the number of the connected electronic devices 10.

In this description, an explanation will be given of the case where the second connecting unit 42 is constructed of a single connector will be explained. However, this invention should not be limited to this. As long as the second wire harnesses 60 connected to the plural electronic devices 10 can be connected to the terminals 43, the second connecting unit 42 can be realized in various embodiments in which it is divided into plural connectors, or the crimping terminals are used like the first connecting unit 41.

The transferring unit 44 can be realized in any configuration such as an integrated circuit, plural discrete components, a microprocessor, a DSP (digital signal processor) or an ASIC (application specific IC). The transferring unit 44 is connected to the respective coupling units 45 by e.g. bonding wires. The transferring unit 44 transfers the first information received by the first connecting unit 41 to the pertinent electronic device 10 through the terminal 43 of the second connecting unit indicated by the circuit identifying data contained in the first information, and transfers the second information to the ECU 20 through the first connecting unit 41 after supplemented with the above circuit identifying data indicative of the pertinent terminal 43 to the second information received at the terminals 43 of the second connecting unit 42.

The relay connector unit 40 described above has a resin sealing body (not shown) made of synthetic resin and having a flat box shape so that the respective terminals are externally protruded in a state where the first connecting unit 41 and the second connecting unit 42 are connected to the transferring unit 44 through the coupling units 45. The resin sealing body is housed in a housing case to constitute a connector. Namely, the relay connector unit 40 communicatably connect the first wire harness 50 and the plural second wire harnesses 60.

The first wire harness 50 ties three electric wires 51, 52, 53 in a bundle. For example, the electric wire 51 serves as a signal line; the electric wire 52 serves as a power source line and the electric wire 53 serves as a grounding line. Each of the electric wires 51 to 53 is a "sheathed electric wire" consisting of a conductive core and an insulating sheath with which the core is sheathed. The one side of the first wire harness 50 is electrically connected to the first connecting unit 41 of the relay connector unit 40 by crimping. On the other side thereof, the connector 54 of a female type corresponding to the external connecting unit 23 of the ECU 20 is mounted.

The first wire harness 50, as shown in FIGS. 2 and 3, connects the plural relay connector units 40 to the single ECU 20 to structure a vehicle-loaded network in the vehicle 1. The communication protocol in the electric wire (control line) 51 of this network may be any of various communication protocols such as LIN (Local Interconnect Network), CAN (Controller Area Network). Unique addresses are assigned to the respective relay connector units 40 connected to the first wire harness 50 at any timing such as the timing of starting.

In this way, the first wire harness 50 is connected between the ECU 20 and the relay connector unit 40 so that the communication (input/output) between the ECU 20 and the relay connector unit 40 can be done.

Each of the second wire harnesses 60, as shown in FIG. 3, bundles the electric wires 63 with the number thereof corresponding to the electronic device 10 to be connected, for example, five electric wires if the five electric wires 63 are required like the electric device 10A; four electric wires if the four electric wires 63 are required like the electric device 10B and eight electric wires if the eight electric wires 63 are required like the electric device 10C. The configuration of the second wire harnesses 60 should not be limited to such a configuration, but may be realized in a various embodiments in which for example, of the second wire harnesses 60 with a predetermined number of electric wires bundled, only the electric wires optionally determined for the electronic device 10 are used.

The one side of the second wire harness 60 is connected to the one side connector 61 so that the pertinent second wire harness 60 is bundled with the other plural second wire harnesses 60. The one side connector 61 can be realized with any shape and size according to a connecting format as shown in FIG. 2, and is not necessarily required to be a single connector. Namely, the one side connector 61 may be a collection of connectors connected to the second connecting unit 42 of the relay connector unit 40. Further, without using the one side connector 61, the second wire harnesses 60 can be connected to the second connecting unit 42 by the crimping terminals like the first connecting unit 41.

The other side of the second wire harness 60 is connected to the other side connectors 62. The other side connector 62 is a connector corresponding to each of the electronic devices 10. As the other side connectors, connectors peculiar to the electronic devices 10 can be employed so that they can be employed in various vehicle-loaded system. Thus, the relay connector units 40 can be standardized.

Since the one side connector 61 is connected to the second connecting unit 42 of the relay connector unit 40, the electric wires 63 of the second wire harness 60 are electrically connected to the terminals 43 of the second connecting unit 42, respectively. Further, since the other side connector 62 is connected to the connector 12 of the electric device 10, the electric wires 63 of the second wire harness 60 are electrically connected to the terminals (not shown) of the connector 12, respectively.

In this way, since the second wire harnesses 60 are connected between the relay connector unit 40 and the plural electronic devices 10, communication (input/output) between the relay connector unit 40 and the plural electronic devices 10 can be done.

Next, an explanation will be given of an example of a transferring processing of the first information and second information in the transferring unit 44.

First, at the second connecting unit 42, it is determined whether or not the second information has been received. If it is determined that the second information has been received, the terminal 43 having received is specified. The second information is supplemented with the circuit identifying data indicative of the pertinent terminal 43. The second information is also supplemented with the address data of the relay connector unit 40 previously assigned by the ECU 20. Thereafter, the second information thus created is transmitted to the ECU 20 through the electric wire 51 of the first connecting unit 41.

On the other hand, if it is determined that the second information has not been received, at the first connecting unit 41, it is determined whether or not the first information has been received. If it is determined that the first information has not been received, the series of processing operations described above are repeated. On the other hand, if it is determined that the first information has been received, a circuit identifying data is extracted from the first information, and the terminal 43 of the second connecting unit 42 corresponding to the circuit identifying data is specified. After the first information is transmitted from the terminal 43 specified to the electronic device 10 through the second wire harness 60, the series of processing operations are repeated.

Further, the transferring unit 44, at every predetermined sampling, receives the second information from all the terminals 43 corresponding to the respective electronic devices 10, supplements the second information with the circuit identifying data and address data, and transfers the second information to the ECU 20 through the electric wire 51 of the first connecting unit 41. Such a configuration is suited to the case where plural items of the second information are received from the electronic devices 10 through the plural terminals 43.

The circuit identifying data are the data indicative of one or plural terminals 43 of the second connecting unit 42. Thus, by correlatively managing the circuit identifying data and the terminals of the electronic devices 10 connected to the pertinent terminals 43, the ECU 20 can control the electronic devices 10. In this description, the explanation has been given of the case where each terminal 43 constitutes a circuit. This invention should not be limited to such a case, but can be realized in various embodiments in which plural terminals 43 corresponding to the electronic device 10 constitute the circuit, or any optionally determined terminal 43 constitutes the circuit.

An explanation will be given of an exemplary method for assembling the wire harness assembly 30 and the relay connector unit 40.

First, the one side of the plural second wire harnesses 60 is assembled with the one side connector 61 and the other side connector 62 is assembled with the other side of each of the second wire harnesses 60. Thereafter, the one side connector 61 is connected to the second connecting unit 42 of the relay connector unit 40. Further, the first wire harness 50 is connected to the first connecting unit 41 of the relay connector unit 40. Thus, the wire harness assembly 30 is constructed.

When the wire harness assembly 30 is arranged in assembling the vehicle 5, the other side connector 62 of the second wire harness 60 is connected to the connector 12 of each of the electronic devices 10 loaded on the vehicle 5. Thus, the relay connector unit 40 and the electronic devices 10 can be communicatably connected to each other. Further, the connector 54 of the first wire harness 50 is connected to the external connecting unit 23*a* of the ECU 20 so that the ECU 20 and the relay connector unit 40 are communicatably connected to each other.

Next, an explanation will be given of an example of the operation (action) of an electronic device control system 1 having the wire harness assembly 30 described above.

When electric power is supplied to the relay connector units 40 through the electric wire 52 of the ECU 20, the relay connector units 40 are actuated and unique address data are assigned to the relay connector units 40 by the ECU 20. When the relay connector unit 40 receives the second information from the electronic device 10 at the second connecting unit 42, it transmits, to the ECU 20 through the first connecting unit 41, the second information supplemented with the circuit identifying data indicative of the terminal 43 having received the second information and the address data.

When the ECU 20 receives the second information at the external connecting unit 23, it specifies the relay connector unit 40 on the basis of the address data contained in the second information and further specifies the pertinent terminal 43 of the second connecting unit 42 in the relay connector unit specified. The ECU 20 specifies the electronic device 10 on the basis of the pertinent terminal 43 and a correlation table previously stored in the storage unit 22. The ECU 20 executes various programs corresponding to the electronic device 10 specified, thereby creating the first information for the terminal of the electronic device 10 to be controlled. Then, on the basis of the above correlation table, the ECU 20 supplements the first information with the address data and the circuit identifying data indicative of the terminal 43 of the second connecting unit 42 of the relay connector unit 40 connected to the terminal of the pertinent electronic device 10. The ECU 20 transmits the first information thus created from the external connecting unit 23 to the relay connector unit 40.

When the relay connector unit 40 receives the first information having the identical address data at the first connecting unit 41, it transmits the pertinent first information to the electronic device 10 through the terminal 43 of the second connecting unit 42 indicated by the circuit identifying data contained in the first information. The electronic device 10 having received the first information executes various controls based on the first information.

As understood from the description hitherto made, in the electronic device control system 1, the first wire harness 50 is connected to the first connecting unit 41 of the relay connector unit 40, the plural second wire harnesses 60 are connected to the second connecting unit 42, the ECU 20 is connected to the first wire harness 50, and the plural electronic devices 10 are connected to the second wire harnesses 60, respectively. Thus, the first wire harness 50, i.e. only three electric wires 51 to 53 are connected to the ECU 20 so that the connecting structure such as the number of terminals of the ECU 20 can be simplified. Further, since the plural second wire harnesses 60 may be collectively connected to the relay connector unit 40, the plural electronic devices 10 can be easily established at different places, thereby greatly facilitating the system structuring. Further, if the relay connector unit 40 is prepared in the form of the wire harness assembly 30, the ECU 20 and the electronic devices 10 are only connected to the wire harnesses of the wire harness assembly 30 so that the production efficiency can be improved.

Further, since the relay connector unit 40 transmits the second information from the electric devices 10, after supplemented with the address data, to the ECU 20, as shown in FIG. 2, multiplex communication between the plural relay connector units 40 and the ECU 20 can be realized through the first wire harness 50. Thus, even if the number of the relay connector units 40 is increased, the common first wire harness 50 are merely connected to the ECU 20. Thus, upsizing of the ECU 20 is prevented and a larger number of electronic devices 10 can be collectively controlled by the single ECU 20.

Additionally, in the electronic device control system 1 described above, the plural relay connector units 40 were employed. However, this invention should not be limited to such a system, but can be realized in various embodiments such as using only a single relay connector 40.

The embodiment described above is only representative of this invention. This invention should not be limited to this embodiment, but can be carried out in various modifications without departing from the gist of this invention.

What is claimed is:

1. A relay connector unit for communicating an electronic control unit with a plurality of electronic devices, comprising:
    a first connecting unit for connecting to the electronic control unit;
    a second connecting unit having a plurality of circuits for connecting to the electronic devices respectively; and
    a transferring unit connected to the first connecting unit and the second connecting unit,
    wherein the transferring unit is configured to transmit first information received by the first connecting unit from the electronic control unit to at least one of the electronic devices through a corresponding circuit connected to the at least one of the electronic devices, on the basis of circuit identifying data included in first information, the circuit identifying data indicating the corresponding circuit to be transferred to or from; and
    wherein the transferring unit is configured to append the circuit identifying data to second information received from one of the electronic devices through the corresponding circuit to transmit the second information to the electronic control unit through the first connecting unit.

2. The relay connector unit according to claim 1, wherein the transferring unit appends address data assigned to the relay connector unit to the second information.

3. The relay connector unit according to claim 1, wherein the first connecting unit is connected to the electronic control unit through a first wire harness; and
    wherein the circuits are connected to the electronic devices through a plurality of corresponding second wire harnesses respectively.

4. An electronic device control system, comprising:
    a relay connector unit which includes:
        a first connecting unit;
        a second connecting unit having a plurality of circuits; and
        a transferring unit connected to the first connecting unit and the second connecting unit;
    a plurality of electronic devices;
    an electronic control unit which controls the electronic devices;
    a first wire harness which connects the first connecting unit to the electronic control unit; and
    a plurality of second wire harnesses which connects the circuits to the electronic devices, respectively,
    wherein the transferring unit transmits first information received by the first connecting unit from the electronic control unit to at least one of the electronic devices through a corresponding circuit connected to the at least one of the electronic devices, on the basis of circuit identifying data included in first information, the circuit identifying data indicating the corresponding circuit to be transferred to or from;
    wherein the transferring unit appends the circuit identifying data to second information received from one of the electronic devices through the corresponding circuit to transmit the second information to the electronic control unit through the first connecting unit; and
    wherein the electronic control unit includes a transmitting and receiving unit which transmits the first information to the first connecting unit and receives the second information from the first connecting unit.

5. The relay connector unit according to claim 1,
    wherein the first connecting unit, the transferring unit, and the second connecting unit are provided in the specified order in a direction of the first information being transmitted from the electronic control unit to one of the electronic devices, and wherein the second connecting unit has a greater number of terminals for connecting to wires than the first connecting unit.

6. The electronic device control system according to claim 4, wherein the first connecting unit, the transferring unit, and the second connecting unit are provided in the specified order in a direction of the first information being transmitted from the electronic control unit to one of the electronic devices, and wherein a greater number of wires are connected to the second connecting unit than to the first connecting unit.

7. The relay connector unit according to claim 1, wherein the transferring unit is configured to communicate with the plurality of electronic devices.

8. The electronic device control system according to claim 4, wherein the transferring unit communicates with the plurality of electronic devices.

9. The relay connector unit according to claim 1, further comprising a resin sealing body in which the first connecting unit, the second connecting unit, and the transferring unit are provided.

10. The electronic device control system according to claim 4, wherein the relay connector unit further includes a resin sealing body in which the first connecting unit, the second connecting unit, and the transferring unit are provided.

11. The electronic device control system according to claim 4, further comprising a plurality of relay connector units.

* * * * *